ABSTRACT

United States Patent
Gloor

[11] 3,755,245
[45] Aug. 28, 1973

[54] POLYPROPYLENE COMPOSITIONS CONTAINING GLASS REINFORCEMENT

[75] Inventor: Walter E. Gloor, Wilmington, Del.

[73] Assignee: Hercules Incorporated, Wilmington, Del.

[22] Filed: Aug. 6, 1971

[21] Appl. No.: 169,836

[52] U.S. Cl............................ 260/41 AG, 106/15 FP
[51] Int. Cl. ............................................. C08f 45/16
[58] Field of Search ............................... 260/41 AG; 106/15 FP

[56] References Cited
UNITED STATES PATENTS

| | | | |
|---|---|---|---|
| 3,472,729 | 10/1969 | Sterman et al........................ | 161/93 |
| 3,013,915 | 12/1961 | Morgan............................ | 260/41 AG |
| 3,385,819 | 5/1968 | Gouinlock........................ | 106/15 FP |

OTHER PUBLICATIONS

Hofmann, W., Vulcanization and Vulcanizing Agents, Macloren & Sons, Ltd., London, 1967, page 228, TS 1891 H6 C.2.

*Primary Examiner*—Morris Liebman
*Assistant Examiner*—J. H. Derrington
*Attorney*—Edwin H. Dafter, Jr.

[57] ABSTRACT

Compositions are taught comprised of polypropylene and silane treated glass fibers wherein the glass fibers are coupled to the polymer by the use of an organic peroxide and a high molecular weight chlorinated organic compound.

3 Claims, No Drawings

POLYPROPYLENE COMPOSITIONS CONTAINING GLASS REINFORCEMENT

This invention relates to improved glass-reinforced propylene polymer compositions. More particularly, it relates to a novel system for effecting bonding between the glass fibers and the polymers in order to enhance the tensile properties and thus the utility of the polymer.

It is known in the art to reinforce a polymer matrix by the incorporation of short length glass fibers into the same. For the optimum result, it is desirable that both the glass and the polymer be treated to improve the bond or the affinity between them. This increased affinity yields substantial improvement in tensile properties, particularly at elevated temperatures. In the case of propylene polymers (generically "polypropylene"), the best method known for this purpose is to incorporate into the matrix a small amount of a maleic anhydride modified polypropylene and to size the glass surface with a silane compound which is reactive with the maleic anhydride.

It is the purpose of this invention to provide a new and different method of accomplishing the coupling of glass reinforcing fibers to a propylene polymer matrix. In accordance with the invention improved coupling is accomplished by means of a system comprised of a high molecular weight halogenated compound, a bis-alkylaryl peroxide and silane treated glass fibers. Stated precisely, the invention is a composition comprised of polypropylene containing about 0.02 to 0.25 percent by weight, based on polypropylene, and preferably 0.1 to 0.25 percent of an organic peroxide, about 2 to 5 percent by weight of a high molecular weight halogenated organic compound containing about 50 percent by weight of the halogen and having at least a portion of the halogen attached to aliphatic carbon atoms, and about 5 to 80 percent, preferably 5 to 35 percent, by weight of silane treated glass fibers. In a preferred embodiment of the invention, the halogen is chlorine.

The term "polypropylene" is used in this specification generically to include crystalline or crystallizable homopolymers of propylene, frequently called isotactic polypropylene and crystalline or crystallizable copolymers of propylene with other lower mono- α-olefins such as ethylene or butene-1, containing up to about 25 mole percent of the second olefin. These polymers and copolymers are well known plastic materials which can be processed by injection molding, extrusion, and like processes.

The halogenated compounds which are employed in the compositions according to the invention are relatively high molecular weight organic compounds containing at least about 50 percent halogen by weight and having at least a portion of the halogen attached to aliphatic carbon. Any halogenated compound fitting the above description can be employed. Such compounds include, by way of example, chlorinated aliphatic hydrocarbons such as chlorinated paraffin, chlorinated cycloaliphatic compounds such as the dimer of hexachlorocyclopentadiene, chlorinated toluenes and chlorinated cyclododecanes. Several especially preferred compounds are the Diels-Alder adduct of hexachlorocyclopentadiene with tetrahydrophthalic anhydride, chloromethyl benzenes such as hexachloroxylene, hexachlorocyclododecane, and a Diels-Alder adduct of 2 moles of hexachlorocyclopentadiene with 1 mole of cyclooctadiene-1,5. Brominated compounds of the above types can also be employed.

The other essential ingredient of the compositions of this invention is an organic peroxide having a molecular weight of at least about 125. Preferred peroxides are alkylaryl peroxides having the formula

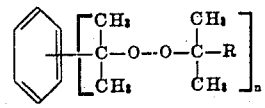

where n is 1 to 4 and R is a methyl or phenyl radical. In particular, it is preferred to use the above peroxide wherein n is 2 and R is methyl.

The glass fiber employed in this invention as reinforcement for the polymer is of relatively short length, e.g., about ⅛ to ½ as is conventional in the reinforced polymer art. These are believed to be coupled to the polymer through the intermediation of the halogenated compound. In order for this to take place, however, it is also necessary for the glass to be sized with a silane containing an active hydrogen atom, as well as other substituents which have an affinity for the glass. These silanes and their use as sizing compounds for glass are well known. Exemplary of the silanes that are used are the amino-and mercapto-alkyl silanes such as 1-aminopropyltrimethoxy silane or 1-mercaptopropyl-trimethoxy silane.

The improved properties of the compositions of this invention over those wherein steps are not taken to effect coupling between the polymer and the glass are evidenced primarily by increased heat deflection temperatures and increased high temperature tensile properties. The mechanism by which coupling takes place is not known for certain but it appears to be similar to that by which a peroxide causes cross-linking of the polymer when the halogenated compound is not present. That is to say, it appears that the peroxide causes one or more halogen atoms to be extracted from an aliphatic carbon atom in the halogenated compound, setting up a series of free radical reactions involving the polymer chain, the halogenated compound, and the silane. An ancillary effect of the peroxide is that it serves as a prodegradant for the polymer thus lowering its melt flow rate and contributing to a more favorable molecular weight distribution thereof.

In addition to the above designated additives which contribute to reinforcement, the compositions will also usually contain stabilizers and antioxidants to protect the polymer against the degradative effects of heat and light. Any of the conventional stabilizer systems normally used for this purpose can be used. A preferred conventional stabilizer system is comprised of a thiodialkanoic acid diester and a phenolic antioxidant having at least two phenolic residues such as, e.g., a thiobisphenol.

The invention is illustrated by the following examples.

EXAMPLES 1 TO 4

Compositions comprised of polypropylene, silane treated glass fibers, a chlorinated compound, glass and bis(α-t-butyl-peroxyisopropyl)benzene were prepared by dry blending of the constituents using the formulations recorded in the following table. The chlorinated compounds are designated as follows:

Compound A: Diels-Alder adduct of tetrahydrophthalic anhydride with hexachlorocyclopentadiene.
Compound B: Diels-Alder adduct of cyclooctadiene-1,5 with 2 moles of hexachlorocyclopentadiene.
Compound C: hexachloroxylene.
Compound D: Diels-Alder adduct of 2 moles of hexachlorocyclopentadiene and 1 mole of dipentene.

TABLE 1

The compositions from Table 1 along with a totally uncoupled polypropylene composition comprised simply of 25 lbs. of stabilized polypropylene and 6½ lbs. of ¼ inch glass fibers were injection molded into 5 inch × 5 inch ×1/16 inch plaques flex strips and tensile bars under 13,000 p.s.i. pressure at 460° F. using ASTM No. 2 mold. These were subjected to tensile testing with the results recorded in Table 2 below.

TABLE 1.—COMPOSITIONS

| Ingredient | Control | Example 1 | 2 | 3 | 4 |
| --- | --- | --- | --- | --- | --- |
| Polypropylene, lbs | 25 | 25 | 25 | 25 | 25 |
| Compound A, g | 340 | 340 | | | |
| Compound B, g | | | 340 | | |
| Compound C, g | | | | 340 | |
| Compound D, g | | | | | 340 |
| Peroxide, g | | 17 | 17 | 17 | 17 |
| Glass ¼", lbs | 6½ | 6½ | 6½ | 6½ | 6½ |
| Stabilizer concentrate, g | 136 | 136 | 136 | 136 | 136 |

TABLE 2

As the results, particularly the high temperature properties, attest, the compositions having both a chlorinated compound and a peroxide have the highest tensile properties. This indicates that better coupling is effected between the polymer and the glass, when both peroxide and chlorinated compound are present.

TABLE 2.—PROPERTIES

| | Control | Example 1 | 2 | 3 | 4 | Uncoupled polypropylene (20% glass) |
| --- | --- | --- | --- | --- | --- | --- |
| Density | 1.035 | 1.044 | 1.035 | 1.045 | 1.038 | 1.03 |
| Flex. mod. at 73° F., 1% sec. ×10³ | 569 | 620 | 585 | 559 | 615 | 620 |
| Flex. mod. at 176° F., 1% sec. ×10³ | 285 | 232 | 364 | 331 | 331 | 267 |
| Deflection temp., ° C. at 264 p.s.i. | 135 | 141 | 143 | 142 | 142 | 109 |
| Melt flow I₂ | 0.64 | 3.73 | 8.7 | 0.50 | 9.2 | |
| Flex. str., 73° F. at 0.5 in./min. ×10³ | 11.6 | 12.4 | 12.2 | 11.3 | 13.2 | 12.8 |
| Flex. str., 176° F. ×10³ | 5.0 | 4.1 | 6.2 | 5.8 | 6.1 | 3.8 |
| Izod impact, fp./in | 2.60 | 2.32 | 2.74 | 1.73 | 2.70 | 3.1 |
| Drop wt. impact in./lbs | 16 | 14 | 19 | 15 | 20 | 16 |

I claim:
1. A product prepared by injection molding a composition comprised of polypropylene containing about 0.02 to 0.25 percent by weight, based on polypropylene, of an organic peroxide having a molecular weight of at least 125, 2 to 5 by weight of a high molecular weight halogenated organic compound selected from the class consisting of:
 a. Diels-Alder adduct of tetrahydrophthalic anhydride with hexachlorocyclopentadiene,
 b. Diels-Alder adduct of cyclooctadiene-1,5 with 2 moles of hexachlorocyclopentadiene,
 c. hexachloroxylene, and
 d. Diels-Alder adduct of 2 moles of hexachlorocyclopentadiene with 1 mole of dipentene, and 5 to 80 percent by weight of aminosilane treated glass fibers.

2. The product of claim 1 where the organic peroxide is an alkylaryl peroxide having the general formula

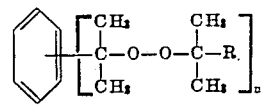

where R is a methyl or phenyl radical and $n$ is 1 to 4.

3. The composition of claim 2 where the peroxide is bis(α-t-butylperoxyisopropyl)benzene.

* * * * *